(12) United States Patent
Choi

(10) Patent No.: US 9,884,398 B2
(45) Date of Patent: Feb. 6, 2018

(54) APPARATUS FOR PROCESSING CIRCULAR OR SQUARE TUBE OR BAR MATERIAL TO DESIRED SHAPE BY FREELY CONTROLLING CUTTING TOOL BY WIRELESS COMMUNICATION

(71) Applicant: DCSENG CO., LTD., Daejeon (KR)

(72) Inventor: Insung Choi, Daejeon (KR)

(73) Assignee: DCSENG CO., LTD., Daejeon (KR)

( * ) Notice: Subject to any disclaimer, the term of this patent is extended or adjusted under 35 U.S.C. 154(b) by 0 days.

(21) Appl. No.: 15/101,550

(22) PCT Filed: Nov. 19, 2014

(86) PCT No.: PCT/KR2014/011110
§ 371 (c)(1),
(2) Date: Jun. 3, 2016

(87) PCT Pub. No.: WO2015/083956
PCT Pub. Date: Jun. 11, 2015

(65) Prior Publication Data
US 2016/0303696 A1  Oct. 20, 2016

(30) Foreign Application Priority Data
Dec. 4, 2013  (KR) .................. 10-2013-0149646

(51) Int. Cl.
*B23Q 15/007* (2006.01)
*B23C 3/00* (2006.01)
(Continued)

(52) U.S. Cl.
CPC .............. *B23Q 15/007* (2013.01); *B23B 3/26* (2013.01); *B23B 5/08* (2013.01); *B23C 3/00* (2013.01); *B23C 5/00* (2013.01); *B23Q 17/00* (2013.01)

(58) Field of Classification Search
CPC .... B23B 3/26; B23B 5/08; B23B 5/00; B23B 3/008; B23Q 15/007; B23Q 17/00
See application file for complete search history.

(56) References Cited

U.S. PATENT DOCUMENTS

| 4,831,785 A | * | 5/1989 | Sigg | ..................... B23Q 15/225 409/186 |
| 7,930,957 B2 | * | 4/2011 | Travez | ................... B23Q 15/12 82/118 |
| 2008/0016696 A1 | | 1/2008 | Marple et al. | |

FOREIGN PATENT DOCUMENTS

| CN | 2871076 Y | 2/2007 |
| CN | 101362226 A | 2/2009 |

(Continued)

OTHER PUBLICATIONS

International Search Report issued in PCT/KR2014/011110 dated Feb. 2, 2015.
(Continued)

*Primary Examiner* — Sara Addisu
(74) *Attorney, Agent, or Firm* — RatnerPrestia

(57) ABSTRACT

An apparatus for processing material to a desired shape by controlling a cutting tool by wireless communication, capable of performing cutting/beveling and processing using one cutting tip and performing cutting and improvement operations of a tube material. The processing apparatus includes a drive wheel rotatably coupled to one side of a main body part while a workpiece penetrates the drive wheel, a main motor unit for rotating the drive wheel (in a C-axis direction), at least one stage coupled to the front of the drive wheel to precisely reciprocate in a center direction of the workpiece (in an X-axis direction), a cutting tool mounted to the stage so as to cut an outside surface or an end surface portion of the workpiece, and a control unit for controlling the stage and the main motor unit, wherein the control unit and the stage are controlled by wireless communication.

7 Claims, 6 Drawing Sheets

(51) Int. Cl.
*B23B 3/26*     (2006.01)
*B23B 5/08*     (2006.01)
*B23C 5/00*     (2006.01)
*B23Q 17/00*    (2006.01)

(56) References Cited

FOREIGN PATENT DOCUMENTS

| | | |
|---|---|---|
| DE | 20119820 U1 | 3/2002 |
| DE | 102005032160 A1 | 1/2007 |
| JP | 2005-238379 A | 9/2005 |
| JP | 2007-105820 A | 4/2007 |
| KR | 2009-0101426 A | 9/2009 |
| KR | 10-2011-0033076 | 3/2011 |
| KR | 10-1077252 | 10/2011 |
| KR | 2012-0040524 A | 4/2012 |
| WO | WO 2012100903 A1 * | 8/2012 ............ B23B 3/26 |

OTHER PUBLICATIONS

The State Intellectual Property Office of China First Office Action issued in CN 201480003144.0 dated May 19, 2016 (12 pages).
Extended European Search Report for European Application No. 14868493.9, dated Jul. 6, 2017, 7 pages.

* cited by examiner

[Fig. 1] PRIOR ART
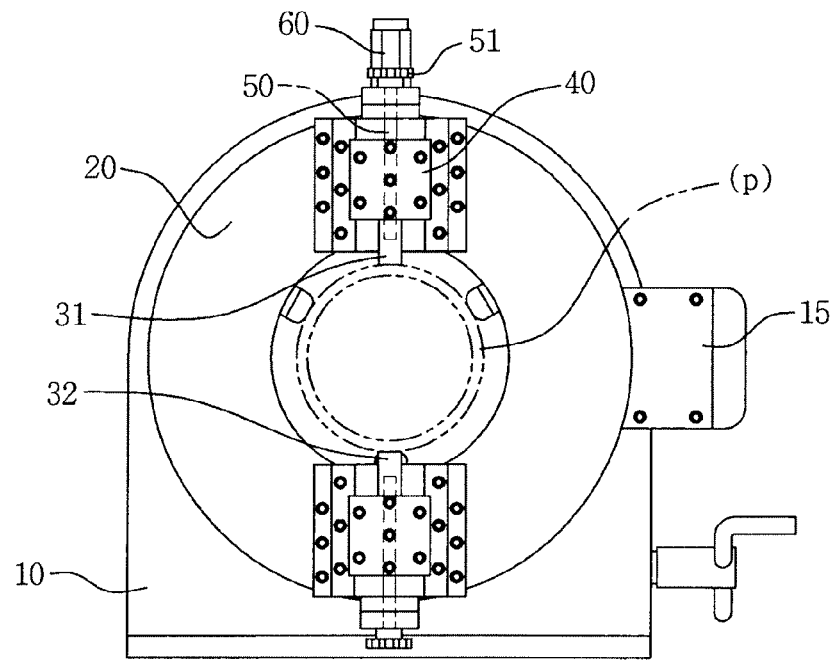
[Fig. 2] PRIOR ART
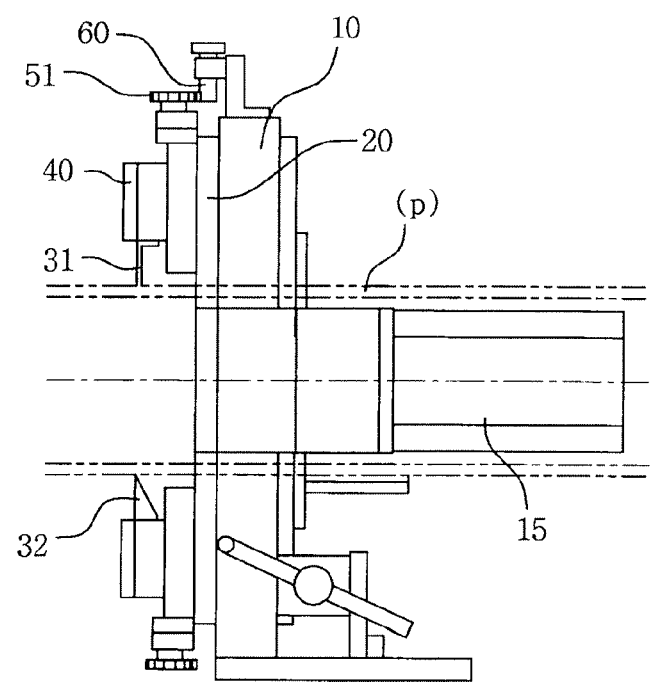

[Fig. 3] PRIOR ART
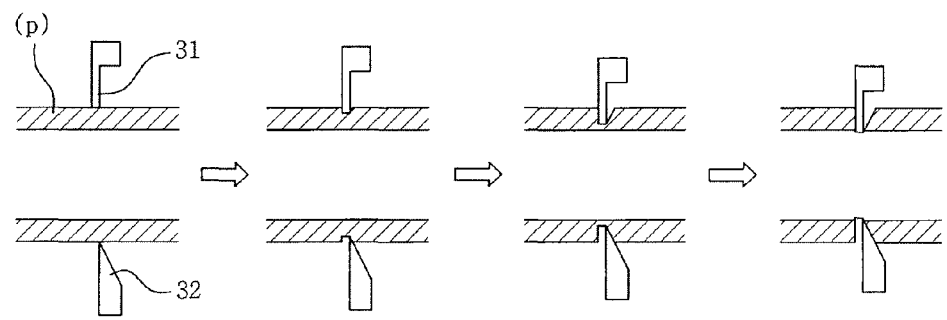
[Fig. 4] PRIOR ART
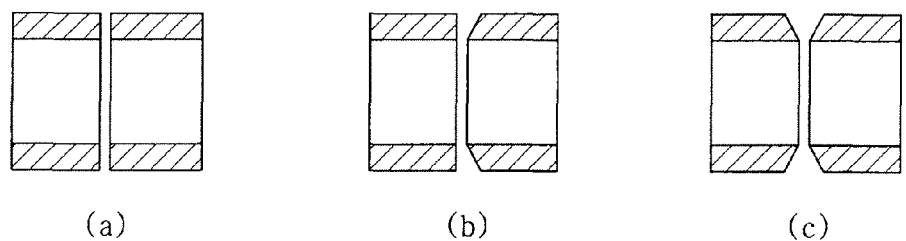
(a)        (b)        (c)
[Fig. 5] PRIOR ART
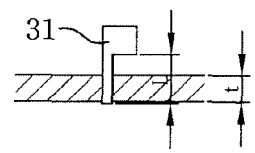
[Fig. 6] PRIOR ART
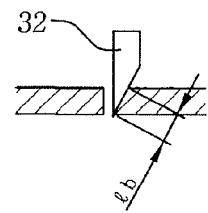

[Fig. 7] PRIOR ART
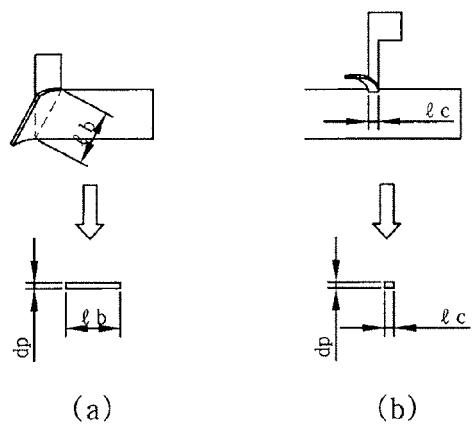
(a)    (b)
[Fig. 8]
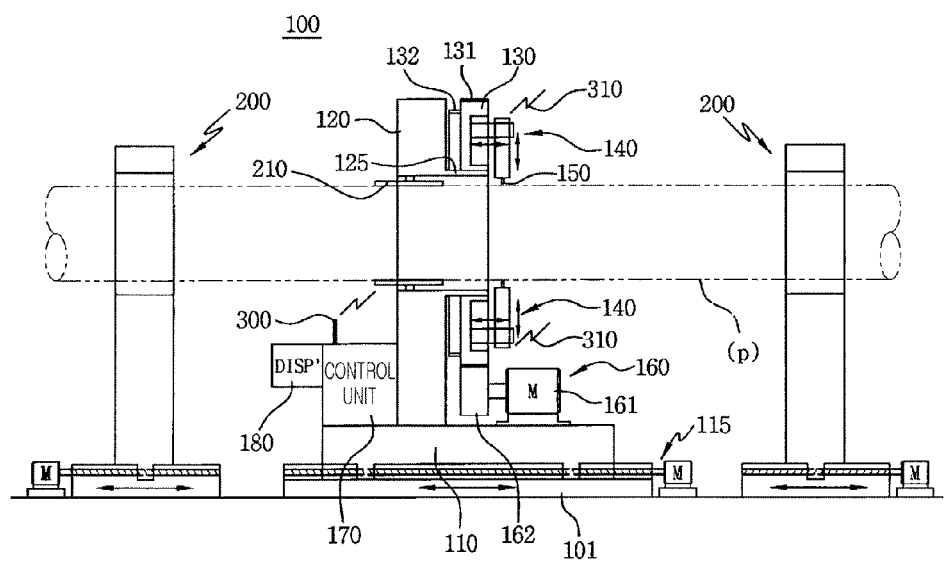
[Fig. 9]
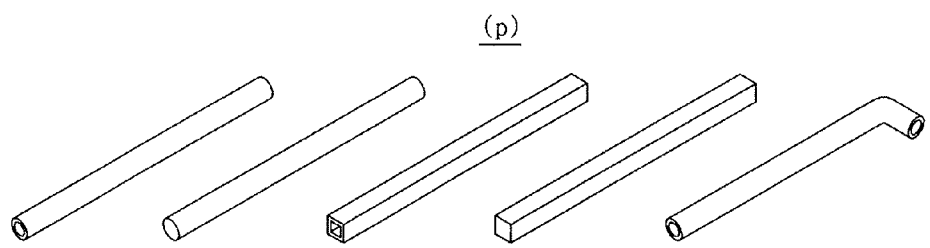

[Fig. 10]
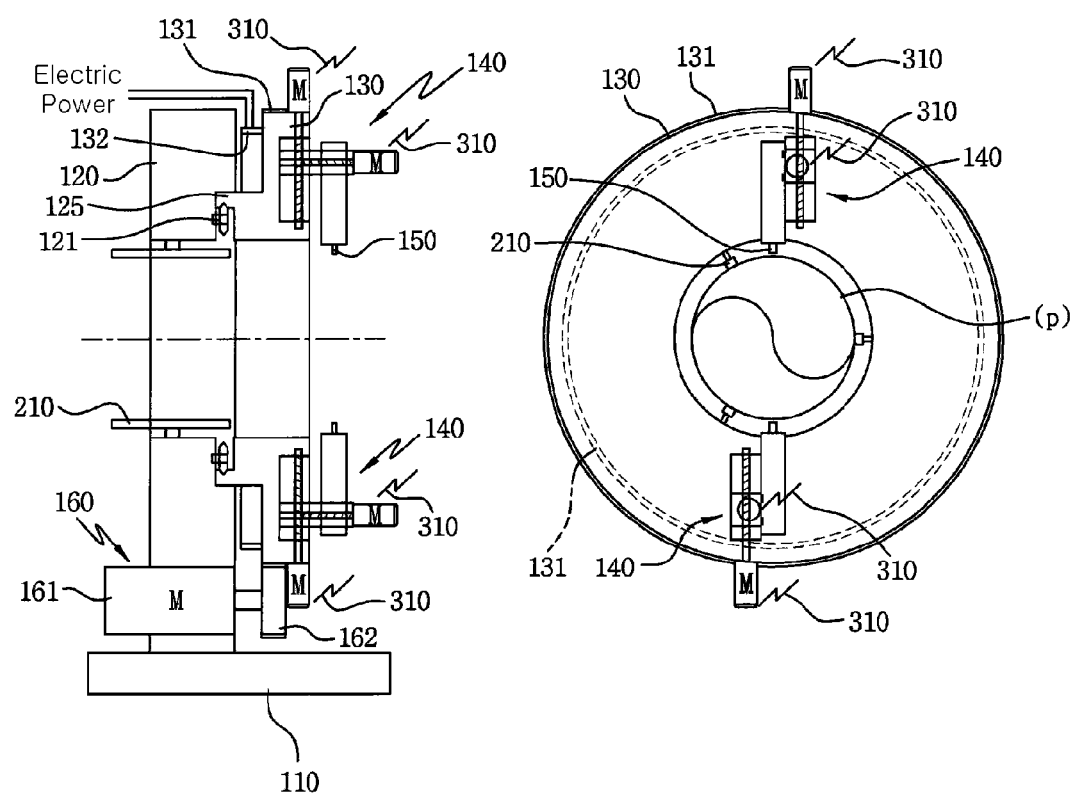

[Fig. 11]
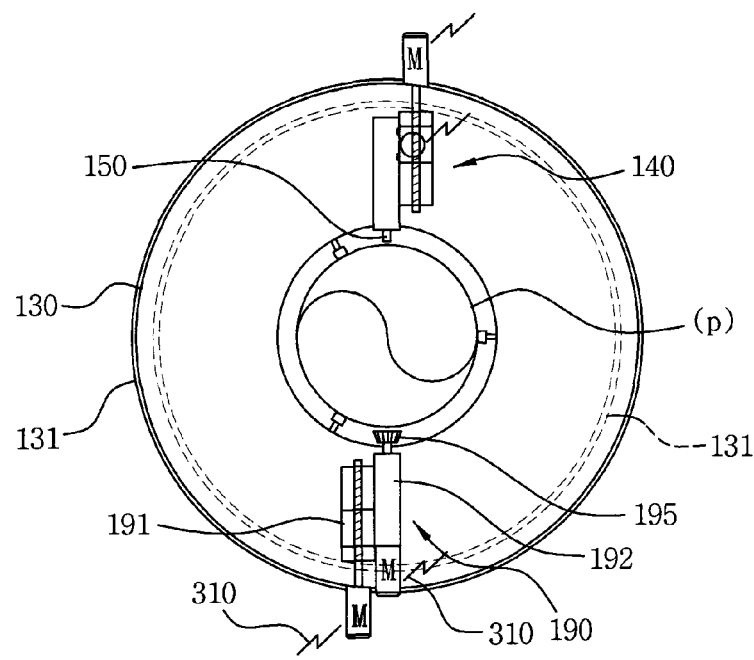
[Fig. 12]
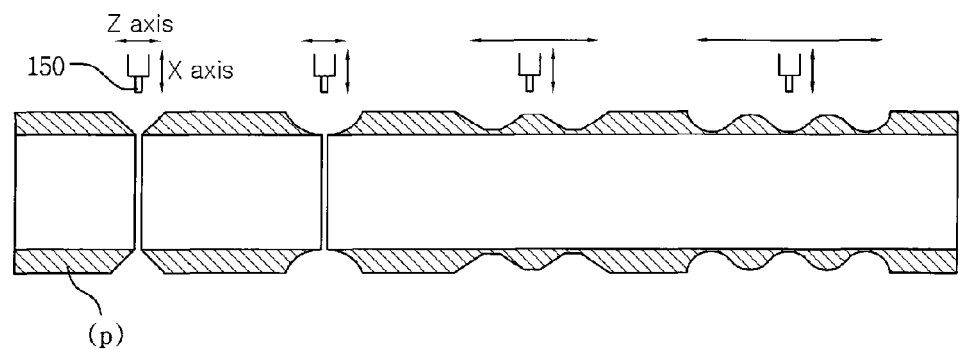
[Fig. 13]
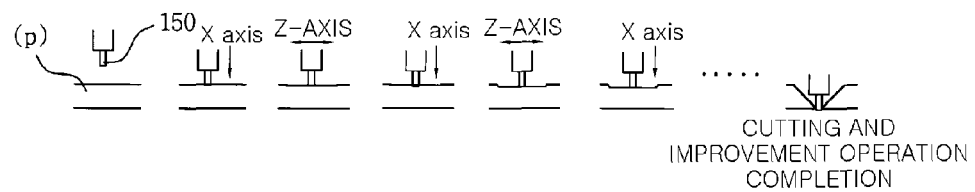

[Fig. 14]
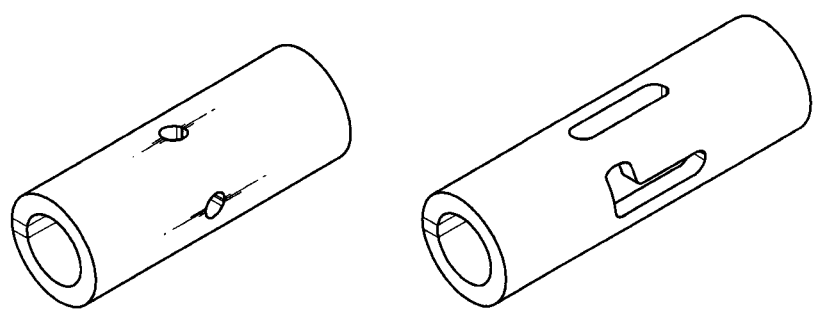

APPARATUS FOR PROCESSING CIRCULAR OR SQUARE TUBE OR BAR MATERIAL TO DESIRED SHAPE BY FREELY CONTROLLING CUTTING TOOL BY WIRELESS COMMUNICATION

CROSS REFERENCE TO RELATED APPLICATIONS

This application is the U.S. National Phase Application of PCT/KR2014/011110, filed Nov. 19, 2014 which claims priority to Korean Patent Application No. 10-2013-0149646, filed Dec. 4, 2013, the contents of such applications being incorporated by reference herein.

TECHNICAL FIELD

The present invention relates to an apparatus for processing a workpiece such as a circular or square tube or bar material, and more particularly, to a processing apparatus capable of cutting a workpiece using one cutting tool turning around the same in a wireless manner and of freely processing the workpiece to a desired shape such as bevel processing or special processing.

BACKGROUND ART

At present, apparatuses for cutting pipes are largely classified into a mechanical cutting apparatus and a fusion cutting apparatus. The mechanical cutting apparatus includes a high-speed cutting machine using a cutting grindstone, a sawing machine using a saw blade, and the like, and the fusion cutting apparatus includes an oxygen cutting machine and a plasma cutting machine.

The mechanical cutting apparatus is an apparatus having a size equal to or greater than a diameter of a pipe to be cut for cutting thereof, and is used to cut small tubes. The fusion cutting apparatus is used to cut large tubes.

The cutting apparatus require considerable time and cost in piping and welding work since it is difficult to vertically cut the tubes and it is impossible to bevel the tubes. For this reason, this is a major cause of fire together with poor work environments.

The cutting apparatus generates lots of noise and dust during cutting or grinding for bevels, and the generated fine dust includes a stone powder as raw material of the cutting grindstone, an adhesive, and a powder of the cut basic material. The fine dust generated during cutting/grinding deteriorates work environments and is fixed to the pipes to thereby aggravate contamination of drinking water and have a fatal influence on production equipment.

In particular, since cleanliness of production structures and purity of pipes are core factors to production in high-tech industries such as semiconductor/electronic/LCD industries, cutting apparatuses using carbide blades are expensively imported and used to maintain the purity of the pipes. However, the expensive cutting apparatuses are not enlarged and supplied to general construction pipe equipment. In addition, considerable time and cost are consumed since special methods of cutting and beveling pipe materials and nonferrous metal (copper, stainless steel, etc.) having large magnitude and plastic lining pipe materials are not present.

Cutting methods and problems according to types of cutters are indicated by the following Table 1.

TABLE 1

| Types and problems of cutters | | |
|---|---|---|
| Cutter Type | Cutting Method | Problems |
| High-speed Cutting Machine | Grinding of cutting stone | 1) A large amount of dust (stone, adhesive, iron powder, etc.) is generated: harmful substances are inserted into pipes.<br>2) There is a lot of noise and poor environments are created due to external dust.<br>3) A large number of sparks are generated: there is a risk of fire or burns.<br>4) Burrs are generated: a load is generated in fluid flow and scale and blockage are caused.<br>5) A method of grinding a cutting stone by vertical displacement:<br>It is impossible to cut tubes having large diameters (limit of the cutting stone); and<br>It is impossible to cut vertically precise tubes. |
| Sawing Machine | Use of band type saw blade | 1) A method of using a band type saw blade by vertical displacement:<br>It is impossible to cut tubes having large diameters (limit of the band type saw blade and the machine);<br>It is impossible to cut vertically precise tubes; and<br>A cutting time is long (poor profitability).<br>2) Durability is decreased due to use of a high-speed steel blade instead of a carbide blade:<br>Cutting oil is used (environment and water pollution). |
| Oxygen/Plasma Cutting Machine | Fusion cutting | 1) Corrosion is accelerated due to oxidation by cutting heat (a non-welding joint being unavailable).<br>2) Foreign substances are fixed into pipes and a risk of fire is increased by sparks.<br>3) A countermeasure for preservation and management of flammable gas is required (risk of explosion accident). |

TABLE 1-continued

Types and problems of cutters

| Cutter Type | Cutting Method | Problems |
|---|---|---|
| | | 4) It is impossible to cut copper tubes/stainless tubes/clad steel tubes/lining steel tubes/synthetic resin tubes.<br>5) A poor cut surface is generated (grinding for surface treatment). |

To resolve these problems, an economic and efficient processing machine for only pipes (cutting, beveling, and welding) has been devised to achieve improvement in environment/safety of a work space, cost reduction, improvement in welding quality, quality improvement of drinking water, equipment protection of industry field, and profitability improvement. Accordingly, a mechanical cutting machine using a carbide blade has been used about 15 years ago and technical development thereof is performed in the foreign country, and a mechanical cutting machine using a carbide blade has been developed about 5 years ago in the domestic country. For example, this is disclosed in Korean Patent Laid-open Publication No. 2009-0101426 (Sep. 28, 2009) (Hereinafter, referred to as "prior art 1"), Korean Patent Publication No. 1077252 (Oct. 27, 2011) (Hereinafter, referred to as "prior art 2"), and Korean Patent Laid-open Publication No. 2012-0040524 (Apr. 27, 2012) (Hereinafter, referred to as "prior art 3"), which are incorporated by reference.

As a representative example of the mechanical cutting machine using a carbide blade, there is a cutting/beveling machine developed 10 years ago for simultaneously performing cutting and beveling, similar to that of the prior art 1, as illustrated in FIGS. 1 and 2.

The prior art will be described below with reference to FIGS. 1 and 2. In the prior art, a main body 10 is provided such that a tube material p is positioned and fixed at a center thereof. A drive wheel 20 rotated by an electric motor 15 is coupled to one side (front side) of the main body 10 while the tube material p penetrates the drive wheel 20. A cutting tool 31 and a beveling tool 32 are mounted in front of the drive wheel 20 so as to face each other (or two or more tools are balanced and provided in front of the drive wheel 20), and the cutting tool 31 and the beveling tool 32 vertically move (in a center direction of the tube material) by a predetermined length whenever the drive wheel 20 rotates once. In this case, the cutting tool 31 and the beveling tool 32 are mounted to a block 40 for guide such that the cutting tool 31 and the beveling tool 32 reciprocate in the center direction of the tube material p in front of the drive wheel 20. The block 40 is screwed to a rotary shaft 50 again and the rotary shaft 50 has a gear 51 formed at an upper end thereof. Accordingly, the rotary shaft 50 vertically moves the block 40 by a pitch of an angle of rotation of the gear 51 whenever the gear 51 comes into contact with a latch 60 protruding from the main body 10, and thus the cutting tool 31 and the beveling tool 32 mounted to the block 40 enter in the center direction of the tube material p.

The apparatus according to the prior art is an apparatus which cuts or simultaneously bevels the tube material while penetrating the same by a predetermined depth whenever the cutting tool 31 and the beveling tool 32 rotate about the tube material p once. However, the apparatus of the prior art has a slow processing speed. That is, since the gear 51 and the rotary shaft 50 are coupled to the block 40 in a simple screw manner, there is a problem in that, when the rotation speed of the drive wheel 20 is increased in order to increase the processing speed, the rotary shaft 50 rotates over a desired angle by strong striking between the gear 51 and the latch 60, thereby exceeding a proper processing depth. In addition, when the gear rotates by one pitch, the gear is smoothly caught by the latch during next rotation thereof. However, when the gear strongly strikes the latch by inertia during rotation at high speed, the gear rotates by 1.5 pitches instead of one pitch. For this reason, when the gear rotates next, the gear is not caught by the latch but passes the latch. In addition, the drive wheel 20 should be rotated in a reverse direction for a long time in order to return the cutting tool 31 and the beveling tool 32 to an original position after cutting the tube material p, or the gear 51 should be returned to an original position by manual reverse rotation after the latch 60 is lifted upward such that the gear 51 is not engaged with the latch 60.

In order to resolve the problems of the above prior art, a pipe cutting apparatus according to the prior art 2 is devised.

In the prior art 2, a rotary shaft is coupled into a gear in a latch form and reaction force of a spring is applied thereto, so that the rotary shaft rotates only by a uniform angle. A return means for reverse rotation of the rotary shaft by selectively tightening a head portion of the rotary shaft is further provided at an upper side of the rotary shaft.

The prior art 2 helps to resolve the above problems of the prior art 1. However, the prior art 2 does not resolve stubborn problems of the prior art 1, such as a problem in which processing to various shapes is not performed, a problem in which a thick tube material having a certain or more thickness is not cut, a problem of damage due to an impact between a gear and a latch, a problem in which a cutting depth is not adjusted, and a problem in which a beveling blade is frequently replaced according to a bevel angle and a bevel shape.

The above problems will be described in more detail. In the prior arts 1 and 2, the tube material is processed in order illustrated in FIG. 3. That is, the cutting tool 31 and the beveling tool 32 process the tube material p in second to fourth orders while entering the tube material p as illustrated in the first drawing of FIG. 3 and then gradually deeply entering the same, thereby allowing cutting and beveling to be performed together. Accordingly, the prior arts 1 and 2 have a limit in that only the processing such as cutting processing illustrated in FIG. 4(a), cutting and one surface beveling processing illustrated in FIG. 4(b), and cutting and both surfaces beveling processing illustrated in FIG. 4(c) is performed on the tube material.

As illustrated in FIG. 5, the cutting tool 31 should naturally have a longer length than a thickness t of the tube material to be cut, for cutting the tube material. However, when the cutting tool has an increased length L to cut the tube material having a thickness t of several tens mm or more, the cutting tool is easily damaged without enduring force applied thereto during cutting.

In addition, as illustrated in FIG. 6, the beveling tool 32 for performing improved processing on a cut surface of the tube material should naturally have a longer blade length 1b than an inclined surface of the tube material to be cut. However, since the beveling blade length 1b is longer than a cutting blade length 1c as illustrated in FIG. 7, the beveling blade has to endure a load corresponding to the force applied thereto.

In addition, the prior arts 1 and 2 relate to a method of cutting the center portion of the tube material by a predetermined depth value when the cutting tool rotates once. It is understood that a load applied during cutting and a load applied during beveling, namely, different transverse cutting forces P act on the material. Here, the transverse cutting force P is determined by a specific cutting resistance Ks, a cutting width l, and a processed depth dp according to a material to be cut, and is indicated by Equation as follows.

$$P = Ks \times l \times dp$$

Accordingly, as illustrated in FIG. 7(b), a pitch is calculated since the cutting width lc and the processed depth dp are predicted without regard to the specific cutting resistance according to the material to be cut when a cutting tip for cutting is used. On the other hand, as illustrated in FIG. 7(a), it is difficult to calculate a proper pitch value (a processed depth value per one rotation) for beveling processing since the cutting width l is changed according to the thickness t of the tube material in the beveling work. For this reason, it is difficult to commercialize the apparatus since the prior arts do not satisfy various work requirements, and the beveling tool is often damaged or there is a problem in tool design to overcome the same.

In addition, the cutting tool and the beveling tool cut the material to a predetermined depth by dropping whenever the gear is caught by the latch and rotates by a certain angle. When the cutting tool and the beveling tool cut and bevel the tube material having a thickness of several tens mm or more, the gear, components located therebelow, and the latch may be damaged by several hundreds of impacts between the gear and the latch. For example, when it is assumed that the gear has five protrusions, a pitch of 1 mm is a case in which the gear rotates once, and the tube thickness is 20 mm, the latch strikes the gear five times to cut the tube material of 1 mm and the latch strikes the gear 100 times to cut the tube material of 20 mm. 10,000 impacts are generated when such an operation is performed 100 times a day, and 1,000,000 impacts are generated when the operation is performed for 100 days. Such an impact causes a larger impulse when the gear rotates at high speed, and has a bad influence on durability of the apparatus.

Since the cutting is performed by a predetermined depth only when the gear is caught by the latch in the prior arts 1 and 2, a selection range of a workpiece in which the cutting depth is not arbitrarily adjusted is decreased. That is, the cutting speed, the cutting depth, and the like of the workpiece are determined according to materials and types of used tools, but there is a problem in that such processing conditions are not adjusted even though the processing conditions are present in the prior arts 1 and 2.

In addition, the bevel angle of the tube material may vary according to types and designs of tube materials. However, the prior arts 1 and 2 have inconvenience in that the beveling tool is necessarily replaced to change the bevel angle.

Meanwhile, the prior art 3 relates to an apparatus for processing ends of pipes. The prior art 3 relates to a technique of cutting an outer diameter and an inner diameter of a tube material and processing various complicated shapes in such a manner that a main body to which a processing body as a cutting tool is mounted enters toward an end surface of the tube material or adjustably moves in a center direction or an outward direction of the tube material.

However, the prior art 3 is utilized to improve a cut surface of the tube material after a cutting process is completed. Therefore, the prior art 3 has a problem in that productivity is decreased and a cutting process is previously performed using a separate cutting machine, compared to the prior arts 1 and 2 in which the cutting and beveling of the tube material are simultaneously performed. When a pipeline operation is performed in a marine or shipbuilding plant and a petrochemical plant, an improvement operation is essential to weld pipes. In this case, when the tube material having a large diameter range and a large thickness range is processed using the cutting/beveling apparatus of the prior art 3, it is inconvenient and inefficient in that the tube material having a weight of several hundred Kg or more is cut by a cutter and is then lifted and put on the apparatus of the prior art 3 so as to perform the improvement operation. In addition, since the improvement operation is performed on both ends of the pipe, it is inconvenient and inefficient in that the heavy pipe is reversely turned for the improvement operation of an opposite end and then the improvement operation is performed on the opposite end.

DISCLOSURE

Technical Problem

Accordingly, an aspect of the present invention has been made in view of the above-mentioned problems, and an object thereof is to provide an apparatus for processing a circular or square tube or bar material to a desired shape by freely controlling a cutting tool by wireless communication, capable of performing cutting/beveling and processing to various shapes using one cutting tip and of simultaneously cutting and beveling a tube material having a thickness of several tens mm or more.

Technical Solution

In accordance with an aspect of the present invention, a processing apparatus for controlling a cutting tool by wireless communication includes a drive wheel rotatably coupled to one side of a main body part while a workpiece penetrates the drive wheel, a main motor unit for rotating the drive wheel (in a C-axis direction), at least one stage coupled to the front of the drive wheel so as to precisely reciprocate in a center direction of the workpiece (in an X-axis direction), a cutting tool mounted to the stage so as to cut an outside surface or an end surface portion of the workpiece, and a control unit for controlling the stage and the main motor unit, wherein the control unit and the stage are controlled by wireless communication.

The drive wheel may have a slip ring formed at the rear thereof, and electric power may be supplied from the slip ring to the stage in a contact or non-contact manner.

The main body part may be installed so as to precisely reciprocate in a longitudinal direction of the workpiece (in a Z-axis direction) by a movement means. In addition, the stage may be configured of a 2-axis stage so as to precisely reciprocate in a longitudinal direction of the workpiece (in a Z-axis direction).

The drive wheel may be coupled to at least one milling stage which precisely reciprocates in the center direction of the workpiece (in the X-axis direction) by control of the control unit by wireless communication, selected one of milling tools may be mounted to a main spindle installed on the milling stage so as to process the outside surface or an end surface portion of the workpiece, and the main motor unit may precisely rotate by control of the control unit.

The stage may be equipped with a linear scale for transmitting movement of a stage block to the control unit.

A chuck(s) for fixing the workpiece may be installed in an inner diameter portion of the main body part or installed to one side or both sides of the main body part.

The main body part may be equipped with a cut position sensor for scanning a cut position marking indicated on the workpiece.

Advantageous Effects

Since at least one cutting tool rotates about a workpiece and simultaneously moves in a center direction or a longitudinal direction of the workpiece by precise control, a processing apparatus according to the present invention can cut the workpiece, simultaneously cut and bevel the workpiece, shave a surface of the workpiece, and process the workpiece to a special shape.

In the processing apparatus according to the present invention, when a tube material having a thickness of several mm to several tens mm is simultaneously cut and beveled, one cutting tool can process the tube material to a V or U shape while moving downward. Thus, when the tube material has a thickness in a range in which the cutting tool moves downward, the tube material having any thickness can be cut at high speed by one tool so as to have various shapes.

Since the processing apparatus according to the present invention uses the standardized cutting tool, the present invention has an economic advantage in terms of maintenance compared to the prior art using an expensive beveling tool for shaving a surface having a relatively large width at a time. It is possible to perform processing by freely setting a bevel range even when a beveling tool is not replaced according to a bevel angle as in the prior art.

In the processing apparatus according to the present invention, since the cutting tool is freely moved by wireless communication, unlike that a cutting depth is determined by the number of times of impact between a gear and a latch as in the prior art, durability of the apparatus can be secured and a cutting condition can be determined as desired according to types and materials of workpieces.

In addition, since various milling tools are additionally mounted and used by precise control, the processing apparatus according to the present invention can realize various processing examples in addition to the above-mentioned processing example.

In addition, since a linear scale for measuring an actual movement distance and transmitting the measured distance to a control unit is installed to a stage and a milling stage controlled by wireless communication, a processing error can be prevented in advance or corrected by comparing and determining a control signal and an actual movement distance.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which:

FIG. 1 is a front view illustrating a pipe cutting/beveling machine according to the prior art;

FIG. 2 is a side view illustrating the pipe cutting/beveling machine according to the prior art;

FIG. 3 is a view sequentially illustrating an operation process of simultaneously performing cutting and beveling in the pipe cutting/beveling machine according to the prior art;

FIGS. 4a-4c are views illustrating a processing example performed in the pipe cutting/beveling machine according to the prior art;

FIG. 5 is a view illustrating a relationship between a cutting tool length and a tube material thickness in the pipe cutting/beveling machine according to the prior art;

FIG. 6 is a view illustrating a relationship between a beveling tool length and a tube material thickness in the pipe cutting/beveling machine according to the prior art;

FIGS. 7a and 7b are views illustrating a relationship between forces applied to a beveling tool during cutting in FIG. 6;

FIG. 8 is a view illustrating a configuration of a processing apparatus according to an embodiment of the present invention;

FIG. 9 is a view illustrating types of workpieces used in the embodiment of the present invention;

FIG. 10 is enlarged front and side views illustrating the vicinity of a main body part of the processing apparatus according to the embodiment of the present invention;

FIG. 11 is a view illustrating an additional installation state of a milling processing part in the front view of FIG. 10;

FIG. 12 is a view illustrating an example processed using the processing apparatus according to the embodiment of the present invention;

FIG. 13 is a view sequentially illustrating a processing example of simultaneously performing cutting and improvement operations as a first illustrative method of processing methods of FIG. 12; and FIG. 14 is a view illustrating an example processed using the milling processing part of the processing apparatus according to the embodiment of the present invention.

BEST MODE FOR INVENTION

Reference will now be made in detail to a processing apparatus according to embodiments of the present invention, examples of which are illustrated in the accompanying drawings. The drawings are not necessarily to scale and in some instances, proportions may have been exaggerated in order to clearly illustrate features of the embodiments.

FIG. 8 is a view illustrating a whole configuration of a processing apparatus according to an embodiment of the present invention. Referring to the drawing, the processing apparatus, which is designated by reference numeral 100, according to the embodiment of the present invention includes a bed 110, a main body part 120 installed to an upper portion of the bed 110 while a workpiece p to be processed penetrates the main body part 120, a drive wheel 130 rotatably coupled to one side of the main body part 120 while the workpiece p penetrates the drive wheel 130, a cutting tool 150 mounted to the front of the drive wheel 130 to reciprocate in a center direction of the workpiece so as to an outside surface or an end surface of the workpiece p, a main motor unit 160 for rotating the drive wheel 130, and a control unit 170 for controlling the cutting tool 150 and the main motor unit 160.

The workpiece p mentioned herein may be a long tube or bar material as illustrated in an example of the workpiece in FIG. 9. The tube or bar material may have a circular or square shape. In addition, the wortkpiece is not necessarily limited to having a linear long shape, and any material may be used as long as the workpiece penetrates and is fixed to the main body part 120 while having a bent shape such as an elbow shape.

The bed 110 is a foundation supporting most components of the processing apparatus 100 of the present invention. The bed 110 preferably has a flat and large spread shape, and is not limited to having a particular shape. The bed 110 is installed on the ground or a lower support 101. The bed 110 may also reciprocate in a Z-axis direction as occasion demands. That is, the Z-axis direction refers to a longitudinal direction of the workpiece, and the bed 110 may be used to be rapidly transferred when the cutting tool 150 is moved to a cutting position of the workpiece. In addition, the bed 110 may also be precisely moved in addition to the rapid transfer. Thus, the bed 110 may have a movement means 115, such as an LM guide and a ball screw, provided in a lower portion thereof to selectively move in the Z-axis direction according to control of the control unit 170.

The main body part 120 installed to the upper portion of the bed 110 may be integrally formed with the bed 110 or be detachably coupled to the bed 110. Since the workpiece penetrates an intermediate portion of the main body part 120 in a state of being horizontally maintained, the main body part 120 preferably has a vertical external appearance while having a horizontal through diameter.

FIG. 10 is enlarged front and side views illustrating the vicinity of the main body part of the processing apparatus according to the embodiment of the present invention. Referring to the drawing, the drive wheel 130 is formed in front of the main body part 120. For convenience sake of description, in the main body part 120, the front is referred to as a side in which the cutting tool 150 is mounted and the rear is referred to as an opposite side in which the cutting tool 150 is not mounted. The drive wheel 130 is coupled to the main body part 120 so as to be rotatable in place about the workpiece to be processed while being not decoupled from the main body part 120. Thus, a coupling ring 125 extending to the inside of the main body part 120 is coupled to the rear of the drive wheel 130 together with a bearing 121. Of course, the coupling ring 125 may be formed to the main body part 120, instead of the drive wheel 130, so as to extend to the inside of the drive wheel 130. Since the drive wheel 130 rotates to process the workpiece, the drive wheel 130 may have a circular plate shape so as not to be eccentric for smooth rotation. The drive wheel 130 has a gear 131 formed on an outer peripheral surface such that power is transferred from the main motor unit 160 to the drive wheel 130. The main motor unit 160 and the drive wheel 130 according to the embodiment of the present invention may be driven in a gear engagement manner as illustrated in the drawing, or may be driven by connection through a timing belt, a V-belt, or a chain. Since the drive wheel 130 having a large diameter has the gear formed on the outer peripheral surface thereof when the drive wheel 130 and the main motor unit 160 are connected in the gear engagement manner, it is difficult to process the same. However, when the V-belt is used to connect the drive wheel 130 and the main motor unit 160, the V-belt may be easily manufactured and processed compared to the gear.

At least one stage 140 to which the cutting tool 150 is mounted is coupled to the front of the drive wheel 130. The stage 140 determines a cut amount and a direction of the workpiece p when the cutting tool 150 cuts the workpiece p while the stage 140 is coupled to the front of the drive wheel 130 to move in an X-axis direction or X- and Z-axes directions. Here, the X-axis direction refers to an axial center direction of the workpiece and the Z-axis direction refers to a longitudinal direction of the workpiece. Accordingly, the stage 140 according to the embodiment of the present invention may be precisely controlled while reciprocating in the axial center direction of the workpiece by establishing a 1-axis stage moved only in the X-axis direction, or may be precisely controlled while reciprocating in the axial center and longitudinal directions of the workpiece by establishing a 2-axis stage moved in the X- and Z-axes directions. Here, when the stage 140 is established as the t-axis stage so as to reciprocate only in the X-axis direction, the processing apparatus 100 according to the embodiment of the present invention is preferably movable in two axial directions such as the X- and Z-axes directions by installing the movement means 115 of the bed 110 thereto. In addition, when the stage 140 is established as the 2-axis stage so as to individually reciprocate in the X- and Z-axes directions, the movement means 115 of the bed 110 may be installed or not be installed.

The stage of the present invention is a motorized stage which may be precisely controlled by a motor, and is configured to receive power for driving the motor and bilaterally transmit/receive control signals. When only one stage 140 is installed to the front of the drive wheel 130, eccentricity due to high-speed rotation of the drive wheel 130 should be seriously considered. Therefore, two stages are preferably mounted to both sides of the drive wheel so as to be balanced, or two or more stages may also be arranged at regular intervals.

The cutting tool 150 is mounted onto the stage 140. The cutting tool 150 is made of carbon steel, high-speed steel, cemented carbide, ceramic, diamond, or the like according to materials of the workpiece, and serves to come into contact with the workpiece according to movement of the stage 140 and shave the surface of the workpiece by rotation of the drive wheel 130.

The main motor unit 160 serves to rotate the drive wheel 130, and includes a main electric motor 161 and a power transfer means for transferring power to the drive wheel 130. The main electric motor 161 may be an AC motor or a DC motor so as to obtain a rotation speed (RPM) required for cutting work. A servomotor may also be used as the main electric motor 161 when the rotation speed and rotation angle of the drive wheel 130 are required to be precisely controlled. The power transfer means may have a gearbox for accelerating or decelerating power of the main electric motor 161. The gearbox has an output gear or a pulley 162 which is engaged with or connected to the gear formed on the outer peripheral surface of the drive wheel 130 through the timing belt, the V-belt, or the chain. The main electric motor 161 may be installed to an upper surface of the bed 110 or the main body part 120 in view of balance or safety of the apparatus as a whole.

Referring to FIG. 8 again, the control unit 170 controls the movement means 115 of the bed 110, the stage 140, and the main motor unit 160. In this case, since the movement means 115 of the bed 110 and the main motor unit 160 are adjacent to the control unit 170 in a state in which the electric motor for generating power is fixed, the movement means 115 and the main motor unit 160 may be controlled in a wired manner. However, since the stage 140 is installed to the front of the drive wheel 130 rotating at high or low speed, it is difficult to connect the stage 140 to the control unit 170 by wires. Thus, a method of establishing control signals of the stage 140 by wireless communication is proposed in the present invention.

In other words, since the stage 140 according to the embodiment of the present invention is installed to the drive wheel 130 which rotates at high speed or continuously rotates at low speed, it is considerably difficult to supply electric power and transfer control signals. That is, in the prior arts 1 and 2, the technique in which the cutting tool necessarily enters by a predetermined amount whenever rotating once is developed since it is practically impossible to automatically control the movement of the cutting tool in a free manner.

However, in order to control the stage 140 in a wireless manner, the present invention resolves a difficulty of control signal transfer in such a way to install a WAP (Wireless Access Point) 300 to the control unit 170 and install a wireless adapter 310 to the stage 140. A slip ring 132 is formed behind the drive wheel 130 in order to supply electric power to the stage 140, and a contact method of connecting electric power through contact between the slip ring 132 and a brush or a non-contact method using liquid metal may be applied and used. When electric power is supplied to the rotating drive wheel 130, it is not difficult to distribute the electric power to the at least one stage 140 in the inside of the apparatus. Detailed distribution description thereof will be omitted.

The control unit 170 according to the embodiment of the present invention may receive information required for processing or include information data thereof, and various processing patterns or ranges may be programmed in the control unit 170. The control unit 170 may be connected to a monitoring part 180 for showing a current processing state or movement to an operator.

In the processing apparatus 100 according to the embodiment of the present invention, a chuck part 200 for fixing the workpiece p may be installed to the front or rear of the main body part 120 or chuck parts may be installed to both front and rear of the main body part 120. The chuck part 200 may be installed to reciprocate toward the main body part 120. The chuck part 200 may be established so as to be precisely movable according to control of the control unit 170 as occasion demands. That is, the chuck part 200 may also process the workpiece p while directly moving in a state of catching the workpiece p, instead of movement of the movement means 115 of the bed 110. In addition, when the long workpiece is consistently cut/beveled in a state in which the workpiece is caught by the chuck part 200 and the main body part 120, the chuck part 200 may clamp and move the workpiece p by a length to be cut in a state in which the main body part 120 is kept still in place.

The processing apparatus 100 according to the embodiment of the present invention may install a cut position sensor (not shown) to the main body part 120 and may scan a cut position marking indicated on the workpiece p to find an accurate cut position while the main body part 120 moves or the chuck part 200 or the bed 110 moves. The cut position sensor may be a proximity sensor or a photo sensor using a sensing technique. Although the cut position sensor is installed at any position as long as being directed toward the outer peripheral surface of the workpiece p, the cut position sensor is preferably installed on an inner diameter surface of the main body part located closest to the outer peripheral surface of the workpiece p. The cut position marking is indicated on the workpiece p by the operator. When the cut position marking is sensed by the cut position sensor, the control unit calculates and adjusts the sensed position and the cut position such that the cut position and the position of the cutting tool coincide with each other, thereby enabling processing of the workpiece to be performed.

The processing apparatus 100 according to the embodiment of the present invention may have a jaw 210 formed on the inner diameter surface of the main body part 120 through which the workpiece p passes to be shrunk or spread in at least two directions. That is, the jaw 210 fixes the workpiece p penetrating the main body part 120 to the main body part 120. Since the main body part 120 is not moves in the Z-axis direction and the chuck part 200 is not moved in the Z-axis direction in a state in which the workpiece p is fixed by the jaw 210, the workpiece p may be processed by only movement of the stage 140 in the X- and Z-axes directions. In this case, the jaw 210 may be operatively connected by a lever (not shown) installed outside the main body part 120 so as to be shrunk or spread. Since a coupling structure between and an operation of the lever and the jaw 210 are understood by a person of ordinary skill in the art and are described in the prior art, detailed description thereof will be omitted.

FIG. 11 is a view illustrating an example in which another cutting processing part is installed to the front of the drive wheel. As illustrated in the drawing, the processing apparatus 100 according to the embodiment of the present invention may further include a milling processing part 190 formed on the front surface of the drive wheel 130. The milling processing part 190 may perform processing work as in a milling machine in a manner of mounting a desired milling tool 195 to a main spindle 192 rotating at high speed. Accordingly, a 1-axis milling stage 191 is formed on the front surface of the drive wheel 130 so as to reciprocate in the X-axis direction, and the high-speed rotating main spindle 192 and the milling tool 195 are mounted on the milling stage 191. In this case, electric power is supplied to the milling processing part 190 through the slip ring 131, and control signals for milling are controlled through wireless signals of the control unit 170 by installing the wireless adapter 310 to the milling processing part 190.

Since the milling processing part 190 should also be movable in the Z-axis direction to perform most functions of the milling machine after establishment of the milling processing part 190, it is necessary to install the movement means 115 of the bed 110 or move the chuck part 200. In addition, since the main motor unit 160 should be precisely controlled during position selection for milling work, it is necessary to use a servomotor rather than a motor providing simple rotation force, for precise control.

Accordingly, the milling processing part 190 may universally process the workpiece to any shape at any processing position by cutting operations of the self-rotating milling tool 195 while simultaneously controlling 1-axis movement in the X-axis direction according to movement of the milling stage 191, 2-axis movement in the Z-axis direction according to movement of the movement means 115 of the bed 110 or the chuck part 200, and C-axis movement according to rotation movement of the drive wheel 130.

The milling processing part 190 is preferably provided on the front surface of the drive wheel 130 while the milling processing part 190 and the at least one stage 140 are balanced and arranged at regular intervals.

The processing apparatus 100 according to the embodiment of the present invention may be precisely controlled on the promise that the drive wheel 130 rotates. Therefore, real-time monitoring may be added to the processing apparatus 100 in order to identify and correct whether the stage 140 and the milling stage 191 are actually moved during processing. Thus, it is necessary to specifically monitor movement of at least the stage 140 and the milling stage 191 in three X-, Z-, and C-axis movements. To this end, a linear scale (not shown) may be installed to a transfer block of the stage 140 and the milling stage 191, and the linear scale transmits and receives signals with the control unit 170 by wireless communication.

Realizable processing method and example of the processing apparatus 100, according to the embodiment of the present invention, formed as described above will be described below together with an operation of the apparatus.

FIG. 12 is a view illustrating an example processed using the cutting tool of the processing apparatus according to the embodiment of the present invention. As illustrated in the first drawing of FIG. 12, an improvement operation together with a cutting operation may be simultaneously performed on a cut surface of the workpiece in an oblique direction. As illustrated in the second drawing, an improvement operation together with the cutting operation may be simultaneously performed on the workpiece in a rounded form. In addition, as illustrated in the third and fourth drawings, the workpiece may also be processed to a special shape such as a round shape.

As an example of the processing method, a processing method of performing the improvement operation in the oblique direction together with the cutting operation as in the first drawing of FIG. 12 will be described with reference to FIG. 13.

As illustrated in FIG. 13, the cutting tool 150 is positioned at a portion to be processed of the workpiece p. In order to position the cutting tool at the portion to be processed of the workpiece, one of a method of setting a processing position by operating the movement means 115 of the bed 110 and a method of setting a processing position by moving the chuck part 200 may be selected and used.

After the processing position is set, the stage 140 is moved in the X-axis direction such that the cutting tool 150 enters the surface of the workpiece in the rotated state of the drive wheel 130. In this case, a proper depth should be considered according to the type and thickness of the workpiece.

Next, the stage is moved in the Z-axis direction in a fixed state in the X-axis direction for processing. In this case, a movement distance in the Z-axis direction may be easily obtained by previously calculating a thickness t and an improvement angle of the workpiece. Desired cutting and beveling operations may be completed by repeatedly performing the processing in the X-axis direction and the processing in the Z-axis direction several times to several tens of times.

In the processing apparatus 100 according to the embodiment of the present invention, since a method of entering the decreased inside of the workpiece from the large outer surface thereof is used when the cutting and improvement operations are performed as illustrated in FIG. 13, the cutting tool 150 may not have a length proportional to the thickness of the workpiece as in the prior arts 1 and 2. That is, in the processing apparatus 100 according to the embodiment of the present invention, the movement distance of the stage 140 in the X-axis direction is a factor for determining the thickness of the workpiece. In addition, since the drive wheel 130 rotates at high speed in the processing apparatus 100 according to the embodiment of the present invention, the processing operation may be completed within a short time even though the processing order is complicated.

In addition, processing conditions according to various types of workpiece may be stored as data, and thus an optimal processing condition may be provided.

Processing the workpiece to an elongated shape as illustrated in the third and fourth drawings of FIG. 12 may not be performed by only movement of the stage 140 in the Z-axis direction. That is, since the stage is structurally proper to be set to be moved within several tens mm in the Z-axis direction, the stage may not have an indefinite long length. For this reason, the movement means 115 of the bed 110 moved in the Z-axis direction is preferably used to process the workpiece having a large width, instead of using the stage moved in the Z-axis direction.

Although examples of cutting, beveling, and processing the outer surface of the workpiece p to a special shape are illustrated in the drawings in the exemplary embodiment of the present invention, an end surface portion of the workpiece may be processed. That is, all of inside and outside processing such as end surface beveling processing, end surface shaving processing, and end surface inner diameter processing of the workpiece p may be performed in such a manner that the cutting tool 150 enters toward of an end surface portion of the workpiece p in a state in which the workpiece p is caught by one chuck part 200.

FIG. 14 is a view illustrating an example processed using the milling tool mounted to the processing apparatus according to the embodiment of the present invention. As illustrated in the first drawing of FIG. 14, the milling processing part 190 according to the embodiment of the present invention may drill the surface of the workpiece or process a tap on the surface of the workpiece using the milling tool 195. As illustrated in the second drawing, most processing operations such as end mill processing and grooving performed in the milling machine may be performed. The milling processing part 190 may precisely rotate the workpiece in a rotary shaft direction by the main motor unit 160, thereby enabling milling to be performed at any position of the outer diameter of the workpiece. The milling processing part 190 may process the workpiece in the longitudinal direction thereof by using the movement means 115 of the bed 110 together.

Various embodiments have been described in the best mode for carrying out the invention. Although the present invention has been described with respect to the illustrative embodiments, it will be apparent to those skilled in the art that various variations and modifications may be made without departing from the spirit and scope of the invention as defined in the following claims.

What is claimed is:

1. A processing apparatus for controlling a cutting tool by wireless communication, comprising:
   a drive wheel rotatably coupled to one side of a main body part while a workpiece penetrates the drive wheel;
   a main motor unit for rotating the drive wheel (in a C-axis direction);
   at least one stage coupled to the front of a drive wheel so as to precisely reciprocate in a center direction of the workpiece (in an X-axis direction);
   a cutting tool mounted to the stage so as to cut an outside surface or an end surface portion of the workpiece; and a control unit for controlling the stage and the main motor unit, wherein the control unit and the stage are controlled by wireless communication, and wherein the drive wheel has a slip ring formed at a rear thereof, and electric power is supplied from the slip ring to the stage in a contact manner by contact between the slip ring and a brush or in a non-contact manner by using a liquid metal.

2. The processing apparatus according to claim 1, wherein the main body part is installed so as to precisely reciprocate in a longitudinal direction of the workpiece (in a Z-axis direction) by an LM guide and a ball screw.

3. The processing apparatus according to claim 1, wherein the stage is configured of a 2-axis stage so as to precisely reciprocate in a longitudinal direction of the workpiece (in a Z-axis direction).

4. The processing apparatus according to claim 1, wherein the drive wheel is coupled to at least one milling stage which precisely reciprocates in the center direction of the workpiece (in the X-axis direction) by control of the control unit by wireless communication, a selected one of milling tools is mounted to a main spindle installed on the milling stage so as to process the outside surface or an end surface portion of the workpiece, and the main motor unit precisely rotates by control of the control unit.

5. The processing apparatus according to claim 1, wherein the stage is equipped with a linear scale for transmitting movement of a stage block to the control unit.

6. The processing apparatus according to claim 1, wherein a chuck(s) for fixing the workpiece is installed in an inner diameter portion of the main body part or installed to one side or both sides of the main body part.

7. The processing apparatus according to claim 1, wherein the main body part is equipped with a cut position sensor for scanning a cut position marking indicated on the workpiece.

* * * * *